United States Patent [19]

Young

[11] Patent Number: 5,606,143
[45] Date of Patent: Feb. 25, 1997

[54] PORTABLE APPARATUS FOR TRANSMITTING WIRELESSLY BOTH MUSICAL ACCOMPANIMENT INFORMATION STORED IN AN INTEGRATED CIRCUIT CARD AND A USER VOICE INPUT

[75] Inventor: James Young, Taipei, Taiwan

[73] Assignee: Artif Technology Corp., Taipei Hsien, Taiwan

[21] Appl. No.: 518,587

[22] Filed: Aug. 23, 1995

Related U.S. Application Data

[63] Continuation-in-part of Ser. No. 220,536, Mar. 31, 1994, abandoned.

[51] Int. Cl.$^6$ .............................. G09B 15/04; G10H 1/36
[52] U.S. Cl. ............................ 84/600; 84/610; 84/645; 84/478; 434/307 A
[58] Field of Search ................. 84/600–602, 609–614, 84/634–638, 645, 477 R, 478, DIG. 6; 434/307 A

[56] References Cited

U.S. PATENT DOCUMENTS

| | | |
|---|---|---|
| 5,127,303 | 7/1992 | Tsumura et al. . |
| 5,286,907 | 2/1994 | Okamura et al. . |

FOREIGN PATENT DOCUMENTS

| | | |
|---|---|---|
| 0439309 | 7/1990 | European Pat. Off. . |
| 1-72784 | 5/1989 | Japan . |
| 3-105785 | 5/1991 | Japan . |
| 4-286500 | 10/1992 | Japan . |
| 2228820 | 5/1989 | United Kingdom . |

*Primary Examiner*—Stanley J. Witkowski
*Attorney, Agent, or Firm*—Merchant, Gould, Smith, Edell, Welter & Schmidt, P.A.

[57] ABSTRACT

A portable apparatus is used to transmit wirelessly both musical accompaniment information, which includes music data of a plurality of music pieces and which is stored in an integrated circuit card, and a voice input from a user for reception and reproduction by an external speaker unit. The portable apparatus includes an elongated casing having a first end portion that is adapted to be gripped by one hand of the user and that confines a receiving space for receiving removably the integrated circuit card therein, and a microphone unit mounted on a second end portion of the casing for transforming the voice input from the user to a first electrical signal. A processor unit is disposed in the casing and is connectable electrically to the integrated circuit card. The processor unit is controlled by a keyboard, which is mounted on an intermediate portion of the casing, so as to transform the music data of a selected one of the music pieces into MIDI information. A MIDI sound source module, which is disposed in the casing, receives the MIDI information from the processor unit and transforms the MIDI information into a second electrical signal. A mixer mixes the first and second electrical signals and generates a third electrical signal which is transmitted wirelessly by a transmitter for reception and reproduction by the external speaker unit.

20 Claims, 12 Drawing Sheets

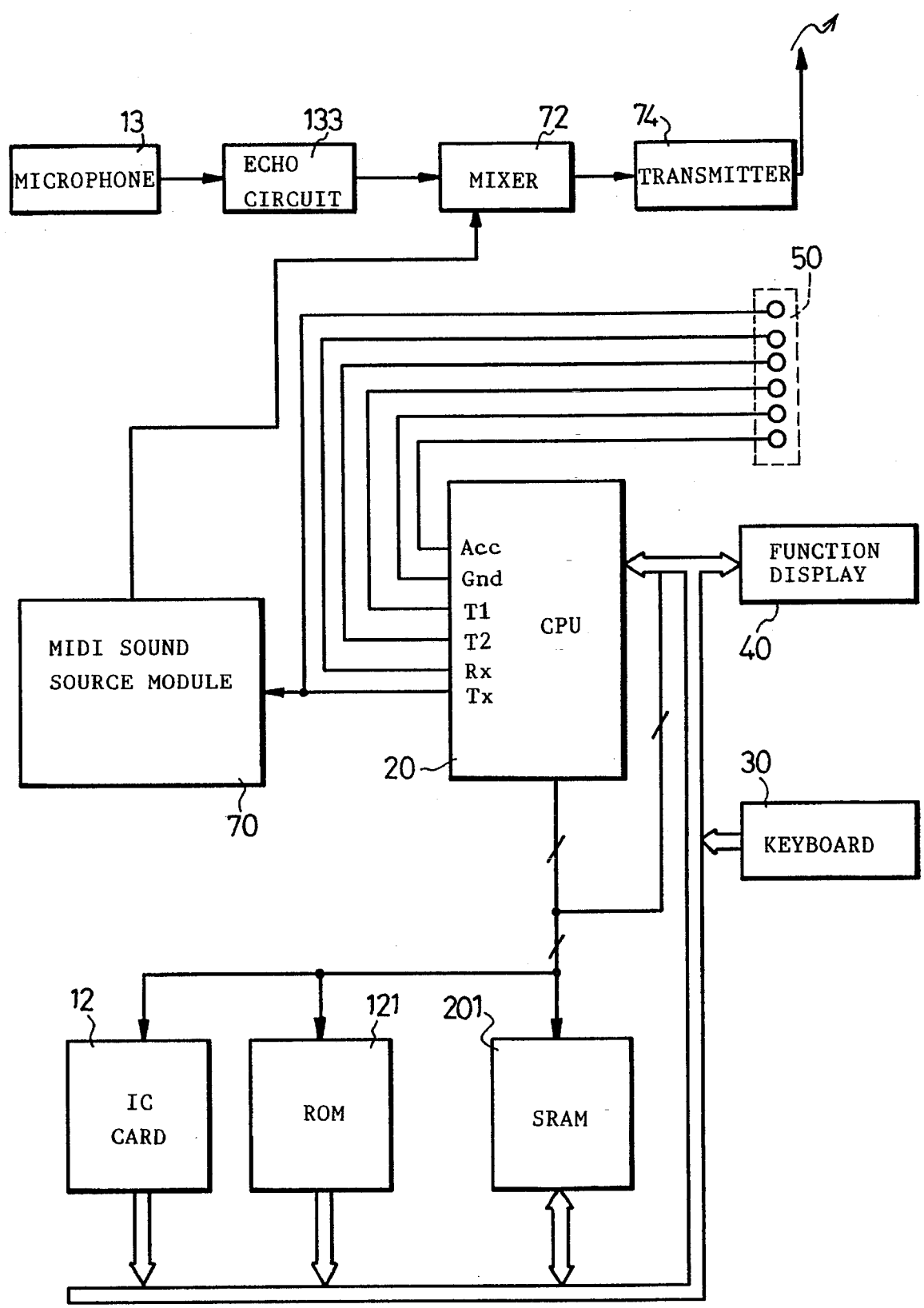
F I G. 3

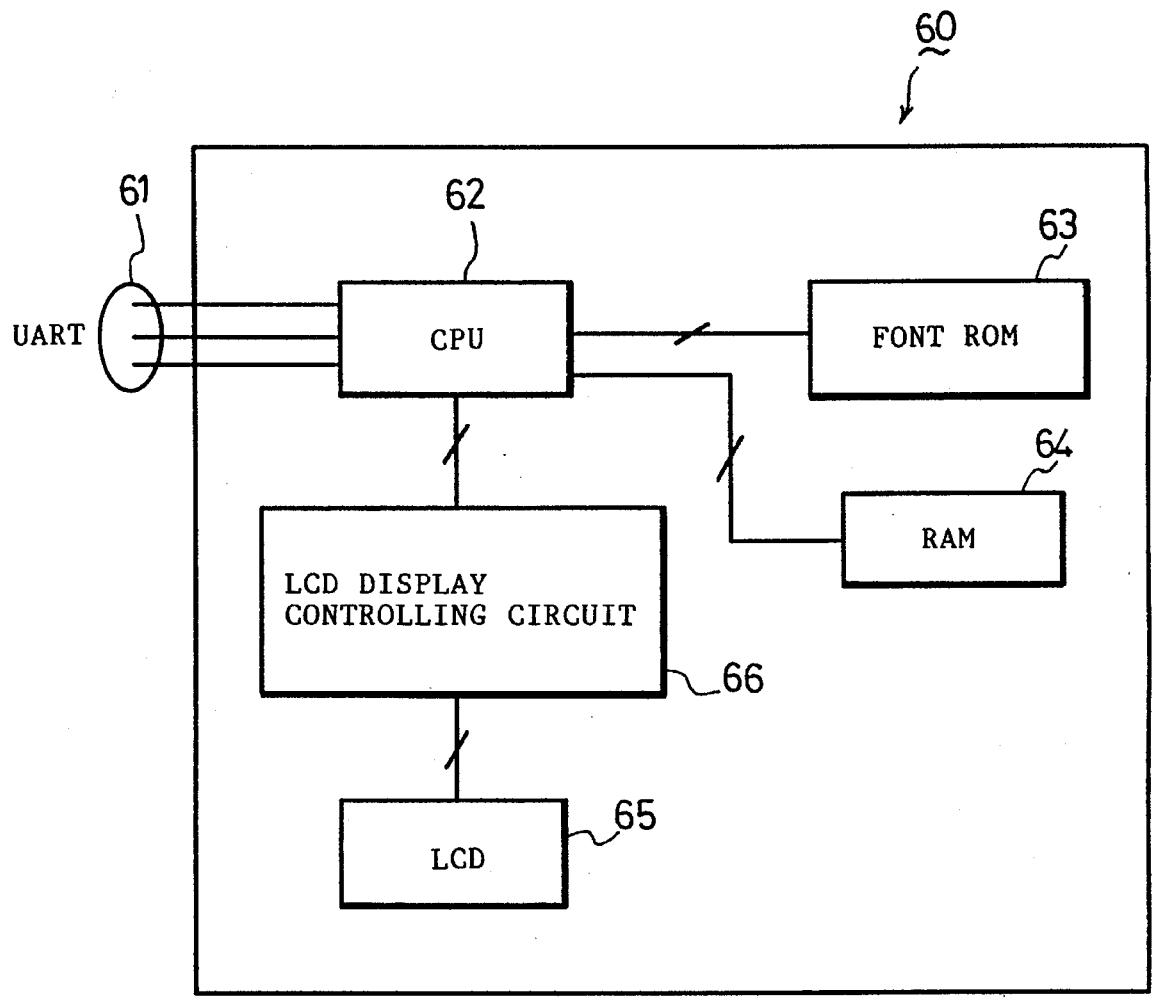
F I G. 4

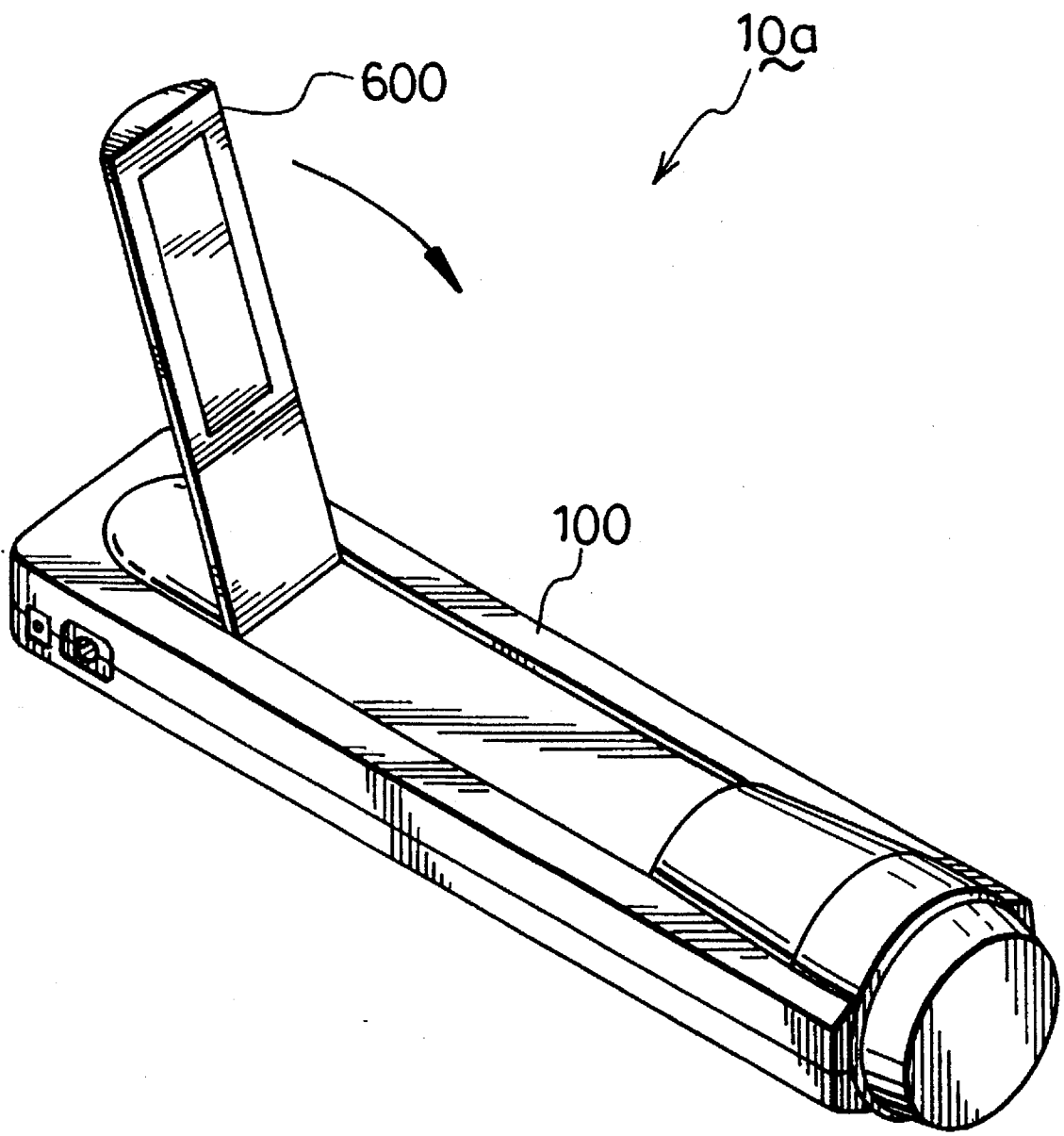
F I G. 12

PORTABLE APPARATUS FOR TRANSMITTING WIRELESSLY BOTH MUSICAL ACCOMPANIMENT INFORMATION STORED IN AN INTEGRATED CIRCUIT CARD AND A USER VOICE INPUT

CROSS-REFERENCE TO RELATED APPLICATION

This is a continuation-in-part (CIP) application of U.S. patent application Ser. No. 08/220,536, filed on Mar. 31, 1994 and now abandoned.

BACKGROUND OF THE INVENTION

1. Field of the Invention

The present invention relates to an apparatus for reproducing musical accompaniment information, more particularly to a portable apparatus that is capable of transmitting wirelessly both musical accompaniment information stored in an integrated circuit card and a voice input from a user for reception and reproduction by an external speaker unit.

2. Description of the Related Art

Japanese Laid-Open Utility Model Patent Publication No. 1-72784, published on May 16, 1989, discloses a music reproduction device which includes a first controller for reading music data from a memory device and for converting the music data into MIDI information, a MIDI sound source module for receiving the MIDI information and for transforming the MIDI information into an electrical signal, a sound output unit for transforming the electrical signal from the MIDI sound source module into sound, a second controller for reading lyric data from the memory device, a video signal generator for converting the lyric data into a video signal, and a monitor for receiving the video signal from the video signal generator and for displaying the lyric data thereon. The memory device may be an integrated circuit card, a magnetic disk or a video tape.

U.S. Pat. No. 5,127,303, issued on Jul. 7, 1992, discloses a karaoke music reproduction device which includes an input device for selecting specified music and lyric data from a memory device, a first processor for reading the specified music and lyric data from the memory device, a second processor for converting the specified music data into MIDI information, a MIDI sound source module for receiving the MIDI information and for transforming the MIDI information into an electrical signal, a speaker for transforming the electrical signal from the MIDI sound source module into sound, a lyric processing unit for receiving the lyric data from the second processor and for converting the lyric data into a video signal, and a display unit for receiving the video signal from the lyric processing unit and for displaying the lyric data thereon.

U.S. Pat. No. 5,286,907 discloses a karaoke music reproduction device which includes a control unit for selecting specified music and lyric data from a recording medium, an information reproducing unit for reading the specified music and lyric data and for converting the specified music data into MIDI information, a MIDI sound source module for receiving the MIDI information and for transforming the MIDI information into an electrical signal, a microphone for transforming a voice input from the user into an electrical signal, a mixer for mixing the electrical signals from the MIDI sound source module and the microphone, a sound output unit for transforming output of the mixer into sound, and an image display unit for receiving the lyric data from the information reproducing unit and for displaying the lyric data thereon.

The main drawback of the aforementioned music reproduction devices is that they are not portable and thus, are inconvenient to transport from one location to another. Therefore, the use of such devices is considerably constrained.

Japanese Laid-Open Invention Patent Publication No. 4-286500, published on Oct. 12, 1992, discloses a sound input system for use in a conventional music reproduction device. The sound input system includes a microphone and an auxiliary display unit mounted detachably on the microphone. Image data passes through a signal distributor before being supplied to a monitor and to the auxiliary display unit.

The sound input system obviates the need for the singer to look at the monitor when singing, and is not directed to solving the aforementioned drawback of the conventional music reproduction devices.

European Patent Publication No. EP0439309 A2 and UK Patent Publication No. GB2228820 A disclose a portable reproducing apparatus for outputting signals from a recording medium, such as a magnetic tape, a compact disc or an integrated circuit card, and a voice input from the user. The portable reproducing apparatus includes a casing body with an accommodating portion for receiving the recording medium and a grip portion to permit holding of the casing body when the apparatus is in use, a microphone attached to one end of the casing body for transforming the user voice input into an electrical signal, a sound reproducing device positioned in the casing body for producing an electrical signal from music data stored in the recording medium, and a speaker mounted on the casing body for generating a sound output corresponding to combination of the electrical signals from the microphone and the sound reproducing device.

It is noted that the aforementioned reproducing apparatus does not incorporate a display unit for viewing lyric data thereon, that a relatively large speaker must be installed in order to obtain good quality and range of sound output, and that the microphone and the speaker should be spaced apart from each other by a distance sufficient to prevent howling. Thus, although the aforementioned reproducing apparatus is portable, it is still relatively large and heavy due to the incorporation of the speaker.

Japanese Laid-Open Invention Patent Publication No. 3-105785, published on May 2, 1991, discloses a compound microphone apparatus which includes a casing body with an accommodating portion for receiving a recording medium, such as a video tape or an integrated circuit cartridge, and a grip portion to permit holding of the casing body when the apparatus is in use. A microphone unit is mounted pivotally on one side of the casing body for transforming a user voice input into an electrical signal. A sound reproducing device is positioned in the casing body and produces a first electrical signal from music data stored in the recording medium. A mixer combines the electrical signals from the microphone and the sound reproducing device, and a speaker is mounted on the other side of the casing body and generates a sound output from the output of the mixer. The sound reproducing device further produces a second electrical signal from lyric data stored in the recording medium, and provides the second electrical signal to a liquid crystal display unit, that is mounted pivotally on the other side of the casing body, to enable the latter to display the lyric data thereon.

The main drawback of the compound microphone apparatus is that it is relatively large and heavy due to the presence of the speaker. As mentioned beforehand, a relatively large speaker must be installed in order to obtain good quality and range of sound output. In addition, the microphone and the speaker should be spaced apart from each other by a distance sufficient to prevent howling.

SUMMARY OF THE INVENTION

The main object of the present invention is to provide a portable apparatus that is capable of transmitting wirelessly both musical accompaniment information stored in an integrated circuit card and a voice input from a user for reception and reproduction by an external speaker unit.

Accordingly, the portable apparatus of the present invention is capable of transmitting wirelessly both musical accompaniment information stored in an integrated circuit card and a voice input from a user for reception and reproduction by an external speaker unit. The musical accompaniment information includes music data of a plurality of music pieces. The portable apparatus comprises:

an elongated casing having a first end portion, a second end portion and an intermediate portion between the first and second end portions, the first and second end portions and the intermediate portion being substantially similar in cross section, the first end portion being adapted to be gripped by one hand of the user and confining a receiving space for receiving removably the integrated circuit card therein;

a microphone unit mounted on the second end portion of the casing for transforming the voice input from the user to a first electrical signal;

a processor unit disposed in the casing and connectable electrically to the integrated circuit card, the processor unit transforming the music data of a selected one of the music pieces into MIDI information;

a keyboard mounted on the intermediate portion of the casing and connected electrically to the processor unit, the keyboard being operable so as to control the processor unit to retrieve the music data of the selected one of the music pieces from the integrated circuit card;

a MIDI sound source module disposed in the casing and connected electrically to the processor unit, the MIDI sound source module receiving the MIDI information from the processor unit and transforming the MIDI information into a second electrical signal;

a mixer disposed in the casing and connected electrically to the microphone unit and the MIDI sound source module, the mixer mixing the first and second electrical signals and generating a third electrical signal; and a transmitter disposed in the casing and connected electrically to the mixer, the transmitter transmitting wirelessly the third electrical signal for reception and reproduction by the external speaker unit.

Preferably, the music data of the music pieces stored in the integrated circuit card is pre-compressed, and the portable apparatus further comprises a memory device disposed in the casing and connected electrically to the processor unit. The processor unit decompresses the music data of the selected one of the music pieces to produce the MIDI information. The processor unit stores the MIDI information in the memory device and provides the MIDI information in the memory device to the MIDI sound source module.

The MIDI information may include a plurality of note events of the selected one of the music pieces. Each of the note events includes time and speed information, pitch information and volume information. The processor unit is preferably provided with a timer therein, and is programmed to execute a play routine. The play routine is provided with a plurality of control parameters for controlling process of the selected one of the music pieces. The keyboard is operable so as to control the processor unit to modify the control parameters and information included in the note events to change accordingly tempo, key and other musical related controls of the selected one of the music pieces. The processor unit provides sequentially the note events to the MIDI sound source module in accordance with the time and speed information thereof counted by the timer.

The musical accompaniment information stored in the integrated circuit card further includes lyric data of the music pieces. The portable apparatus further comprises a caption expansion slot connected electrically to the processor unit and mounted to the casing. The processor unit retrieves the lyric data of the selected one of the music pieces from the integrated circuit card and provides the retrieved lyric data to the caption expansion slot.

A caption display unit, such as a handheld liquid crystal display (LCD) unit, has a connector for engaging removably the caption expansion slot to connect electrically the caption display unit and the processor unit. Alternatively, a television caption system may be connected to the caption expansion slot for interfacing the processor unit and an external television set to enable the latter to display the lyric data from the caption expansion slot thereon.

BRIEF DESCRIPTION OF THE DRAWINGS

Other features and advantages of the present invention will become apparent in the following detailed description of the preferred embodiments, with reference to the accompanying drawings, of which:

FIG. 3 is a schematic circuit block diagram of the first preferred embodiment;

FIG. 4 is a schematic circuit block diagram of a handheld LCD caption display unit of the first preferred embodiment;

FIG. 12 illustrates how a caption display unit of the second preferred embodiment is turned relative to an elongated casing during use.

DETAILED DESCRIPTION OF THE PREFERRED EMBODIMENTS

Figure 1:
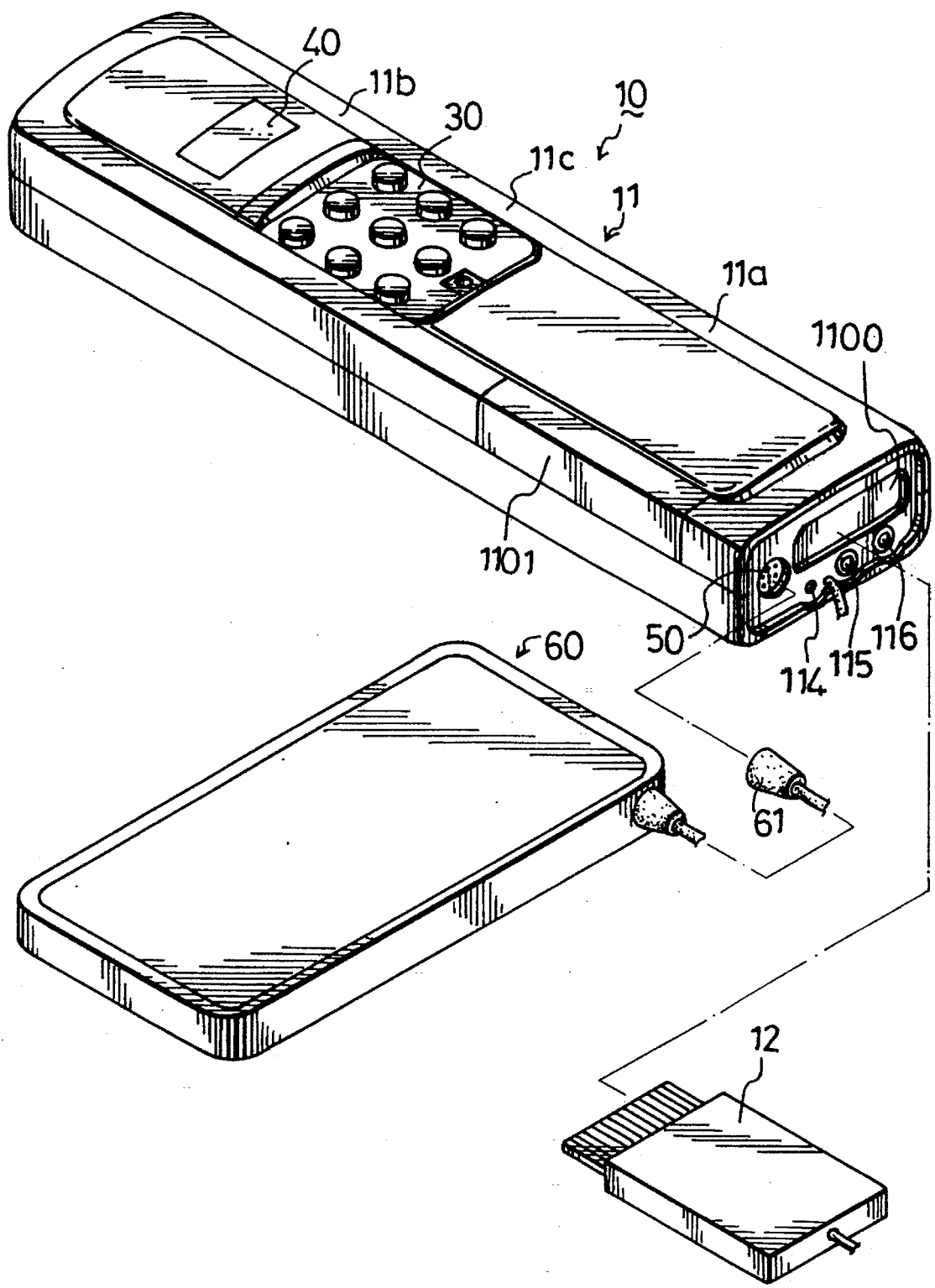
FIG. 1 is a perspective view of the first preferred embodiment of a portable apparatus according to the present invention.
Figure 2:
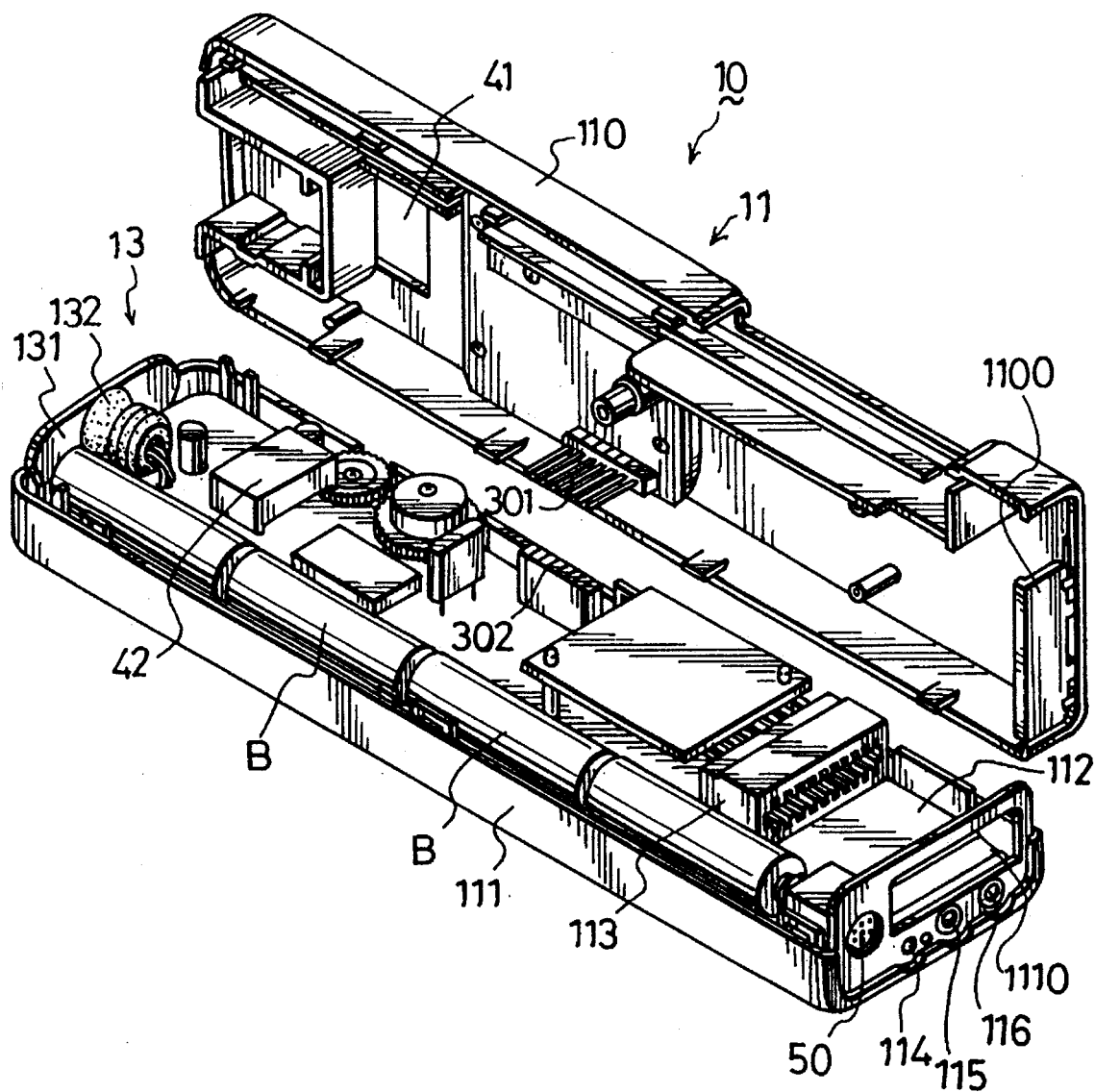
FIG. 2 is an exploded view of an elongated casing of the first preferred embodiment.

Referring to FIGS. 1 to 3, the first preferred embodiment of a portable apparatus 10 according to the present invention is shown to comprise an elongated casing 11 which has a first end portion 11a, a second end portion 11b and an intermediate portion 11c between the first and second end portions 11a, 11b. The first and second end portions 11a, 11b and the intermediate portion 11c substantially have similar oval cross sections. In this embodiment, the first and second end portions 11a, 11b and the intermediate portion 11c of the casing 11 are generally rectangular in cross section. The casing 11 consists of complementary first and second casing halves 110, 111.

The second casing half 111 is formed with a battery receiving space for receiving batteries (B) therein. The first casing half 110 is formed with a detachable cover 1101 to permit placing of the batteries (B) in the battery receiving space.

In the event that an external power supply, such as line power, is to be used, the second casing half 111 has a power supply connector 114 mounted thereon to permit connection of the portable apparatus 10 to an external power source.

The first end portion 11a is adapted to be gripped by one hand of the user and confines a receiving space 110 for receiving removably an integrated circuit card 12 which contains musical accompaniment information that includes music and lyric data of a plurality of music pieces. The second casing half 111 is formed with an opening 1110 at a distal side thereof to permit entry of the integrated circuit card 12 into the receiving space 112. The first casing half 110 has a plate 1100 mounted pivotally at a distal end thereof to cover the opening 1110. A connector 113 is mounted on the second casing half 111 and is disposed in the receiving space 112 for engaging removably the integrated circuit card 12.

A microphone unit 13 is mounted on the second end portion 11b of the casing 11 for transforming a voice input from the user to a first electrical signal. The microphone unit 13 includes a perforated cap 131 mounted to the second end portion 11b of the casing 11 at a distal open side of the latter and an electroacoustic transducer 132 disposed in the casing 11 adjacent to the perforated cap 131.

A central processing unit (CPU) 20 is disposed in the casing 11 and is connected electrically to the connector 113 in the receiving space 112 of the casing 11. A keyboard 30 is mounted on the first casing half 11 at the intermediate portion 11c of the casing 11 and is connected electrically to the CPU 20 via connectors 301, 302 mounted respectively on the first and second casing halves 110, 111. The keyboard 30 is operable so as to control the CPU 20 to retrieve information of a selected one of the music pieces from the integrated circuit card 12. Because of the proximity of the keyboard 30 to the first end portion 11a of the casing 11, operation of the keyboard 30 can be achieved with ease.

A function display unit 40 is disposed on the second end portion 11b of the casing 11 and is connected electrically to the CPU 20. In this embodiment, the function display unit 40 includes a transparent window 41 formed on the first casing half 110 at the second end portion 11b of the casing 11, and an LED display 42 mounted on the second casing half 111 and viewable from the window 41. The LED display 42 is connected electrically to the CPU 20 and is activated by the latter so as to display identification data of the selected one of the music pieces thereon and the status of the portable apparatus 10.

A caption expansion slot 50 is mounted on the distal end of the second casing half 111 and is connected electrically to the CPU 20. The CPU 20 retrieves the lyric data of the selected one of the music pieces from the integrated circuit card 12 and provides the retrieved lyric data to the caption expansion slot 50.

A caption display unit 60 has a connector 61 for engaging removably the caption expansion slot 50 to connect electrically the caption display unit 60 and the CPU 20. Referring to FIGS. 1 and 4, the caption display unit 60 is a handheld display unit and comprises a CPU 62 connected electrically to the connector 61 for receiving the lyric data from the caption expansion slot 50, a font memory 63 connected to the CPU 62 for storing character fonts therein, a random access memory 64 connected to the CPU 62 for storing the lyric data from the CPU 62 therein, a liquid crystal display 65, and a liquid crystal display controlling circuit 66 which interconnects the CPU 62 and the liquid crystal display 65 to enable the latter to show the lyric data from the caption expansion slot 50 thereon.

Referring once more to FIG. 3, the portable apparatus 10 further comprises a built-in read only memory (ROM) 121, a static random-access-memory (SRAM) 201, a MIDI sound source module 70, an echo circuit 133, a mixer 72 and a transmitter 74.

The contents of the ROM 121, which is connected to the CPU 20, are similar to those of the integrated circuit card 12, thereby permitting use of the portable apparatus 10 even without the integrated circuit card 12. The installation of the integrated circuit card 12, however, is preferred so that a wide selection of music pieces can be made available to the user. Preferably, the storage size of each of the integrated circuit card 12 and the ROM 121 is about 4 megabytes.

The CPU 20 transforms the music data of a selected one of the music pieces, which may be from the ROM 121 or the integrated circuit card 12, into MIDI information. Preferably, the music data of the music pieces stored in the integrated circuit card 12 are pre-compressed. The CPU 20 decompresses the music data of the selected one of the music pieces to produce the MIDI information. The MIDI information includes a plurality of note events of the selected one of the music pieces. Each of the note events includes time and speed information, pitch information and volume information. The CPU 20 is provided with a timer therein and is programmed to execute a play routine. The play routine is provided with a plurality of control parameters for controlling process of the selected one of the music pieces. The keyboard 30 is operable so as to control the CPU 20 to modify the control parameters and information included in the note events to change accordingly tempo, key and other musical related controls of the selected one of the music pieces. The CPU 20 stores the note events in the SRAM 201, which has a storage capacity of about 64 kilobytes, and provides sequentially the note events in the SRAM 201 to the MIDI sound source module 70 in accordance with the time and speed information thereof counted by the timer.

The MIDI sound source module 70 may be a Dream 8905 or 9203 compatible DSP chip and receives the MIDI information from the CPU 20. The MIDI sound source module 70 generates 16-bit stereo sounds using an internal wave table. One physical embodiment for achieving high quality and cost effective sounds is to shift certain portion of sounds out from the original 128 kinds of sound in the general MIDI standard. When generating a sound which is not in the shifted sounds, a most similar sound is automatically used to replace the same. In this way, the size of the read-only memories (not shown) in the MIDI sound source module 70 can be reduced, and the sampling duration of each sound can be increased to improve the sound quality. Therefore, superior sound quality can be obtained without the need of additional quality circuits, such as a digital signal processor (DSP). In this embodiment, the sampling rate of the wave table is 44.1 KHz.

Figure 5:
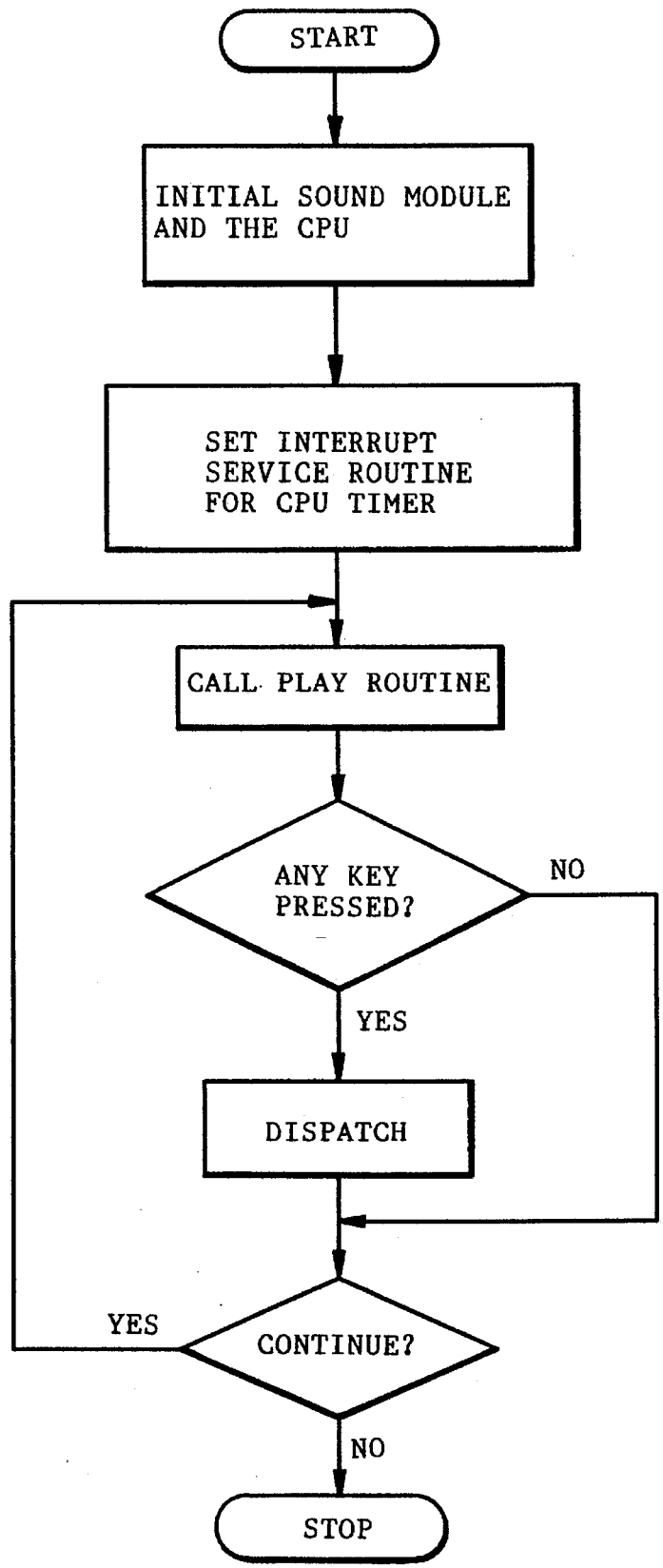
FIG. 5 is a flowchart of a main program to be executed by a processor unit of the preferred embodiment.
Figure 6:
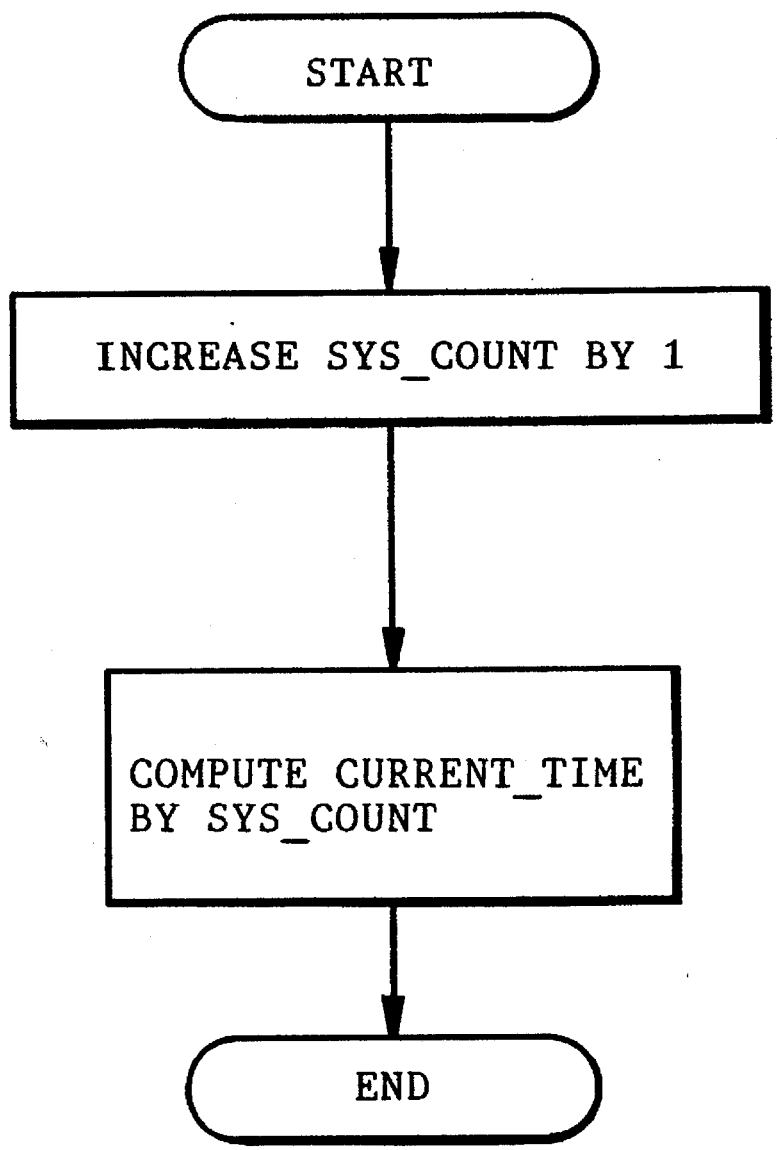
FIG. 6 is a flowchart of an interrupt service routine of the main program.
Figure 7:
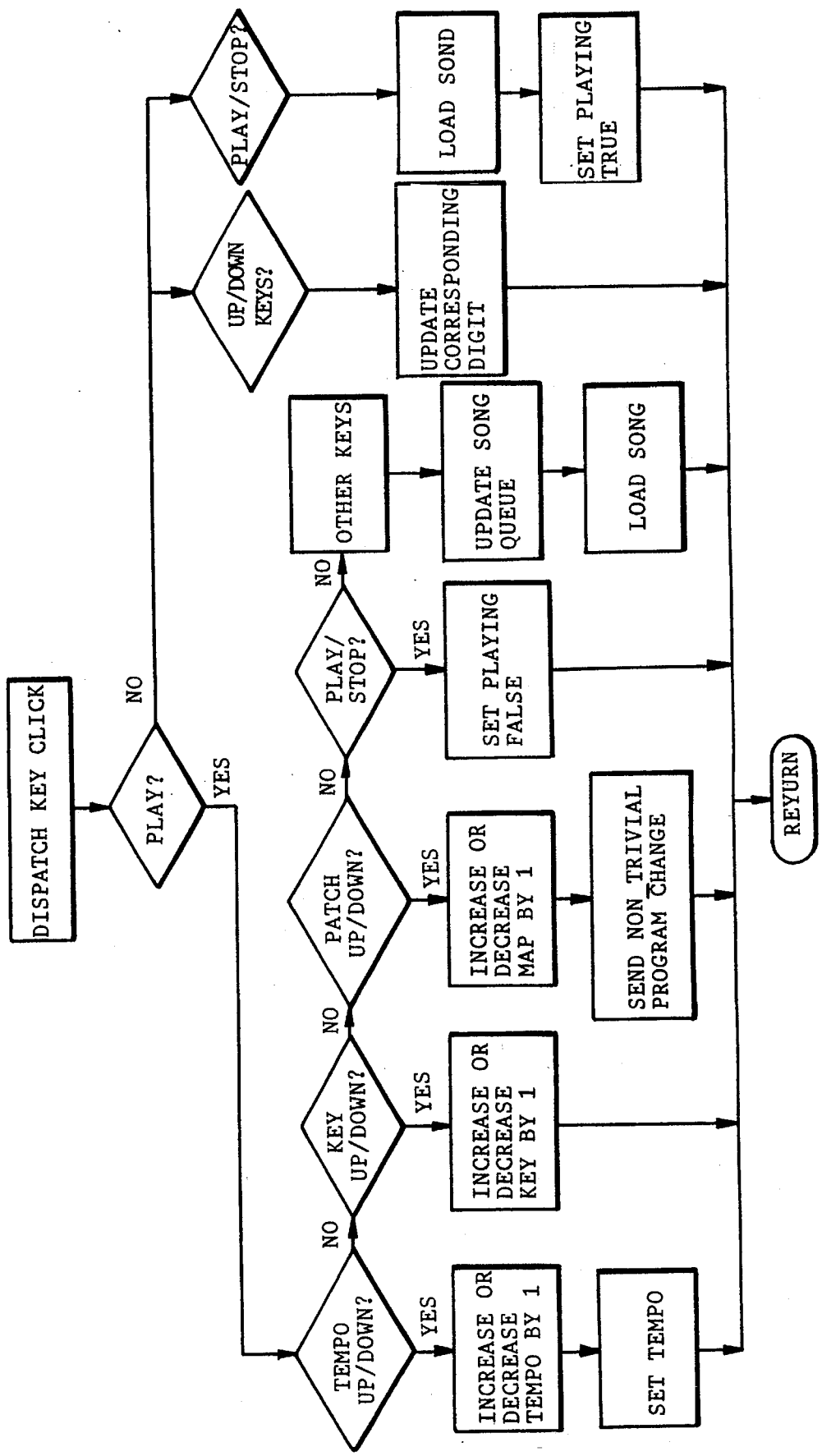
FIG. 7 is a flowchart of a key-click dispatching routine of the main program.

The CPU 20 is capable of executing a main program, the flowchart of which is shown in FIG. 5. Three subroutines of the main program, including an interrupt service routine, a key-click dispatching routine and a play routine, are respectively shown in FIGS. 6 to 8. These routines are described briefly as follows:

1. Accept keyboard interrupt commands, and dispatch key-clicking to select song, queue to song list, or start song playing.

2. Transfer lyric and synchronizing data to the caption expansion slot 50.

3. Decompress pre-compressed music data of the selected one of the music pieces from the ROM 121 or the integrated circuit card 12, and store the decompressed music data in the SRAM 201.

Figure 9:
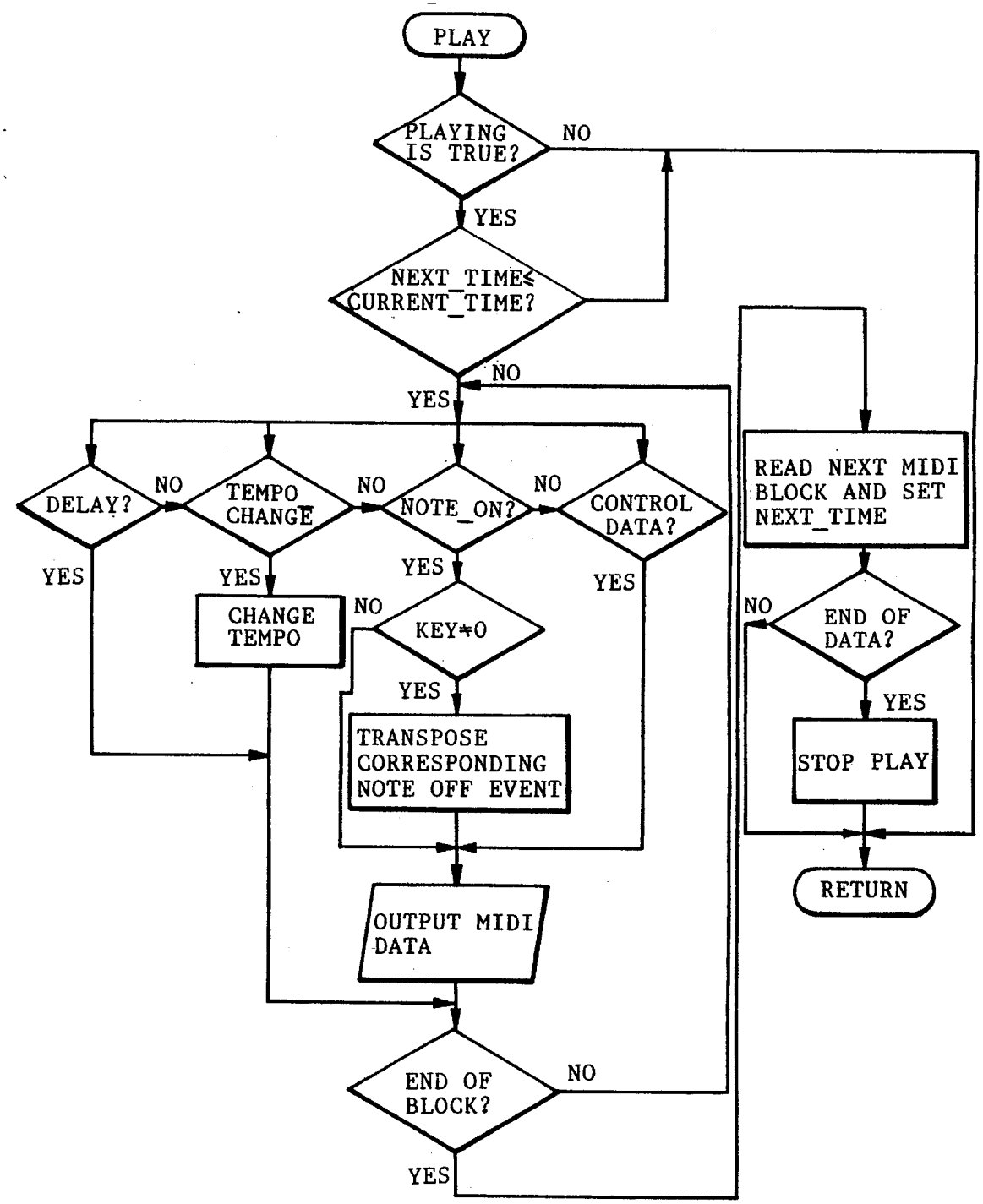
FIG. 9 is a flowchart of a music playing operation of the processor unit.

4. Read music data from the SRAM 201 and output proper MIDI note events to the MIDI sound source module 70. Real-time transposition can be achieved in this process by the CPU 20. A flowchart of a music playing operation of the CPU 20 is shown in FIG. 9.

5. Change tempo, key and other musical related controls of the selected one of the music pieces.

6. Adding and deleting titles of selected music pieces in a list. Before a music piece is to be played, a checking operation is conducted to determine whether the music piece exists in the ROM 121 or in the integrated circuit card 12.

7. Control the display of lyrics and other data on the caption display unit 60.

Figure 8:
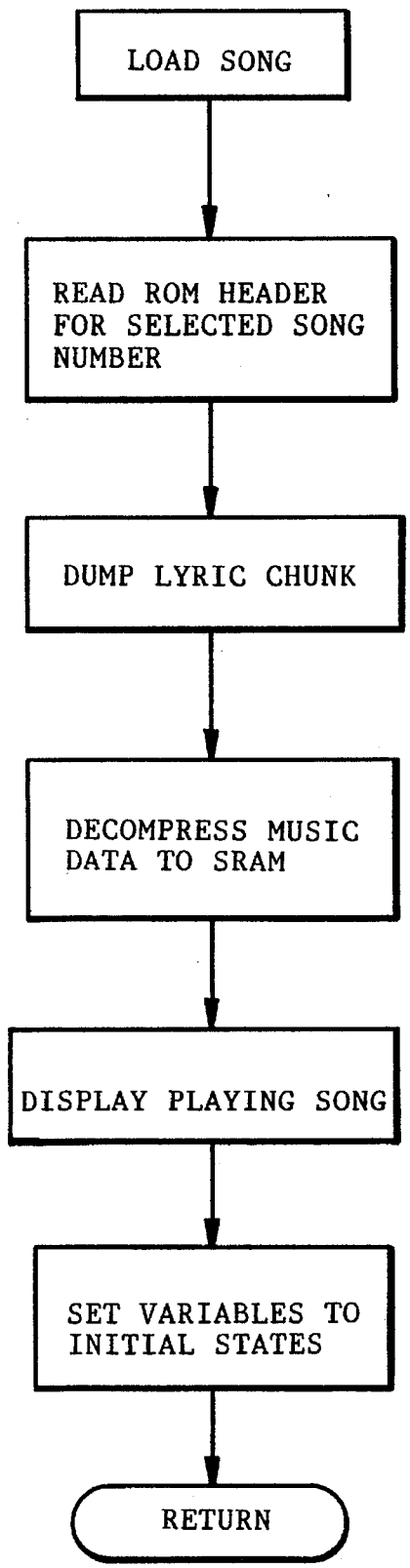
FIG. 8 is a flowchart of a play routine of the main program.

The play routine shown in FIG. 8 describes the operation which occurs when a "play" key of the keyboard 30 is activated. As shown, a song (or music piece) is loaded, and the header stored in the ROM 121 or the integrated circuit card 12 is read to determine a selected song number. Then, a chunk of lyric data is dumped from the memory (i.e., from the ROM 121 or the integrated circuit card 12 to the caption display slot 50). Next, music data is decompressed and stored in the SRAM 201.

Once the lyric data and the music data have been retrieved, the playing song is displayed. Finally, the appropriate variables which control the reproduction of the song are reset, and the play routine returns to an initial state.

The keyboard 30 is used to input the codes of selected music pieces, and to add and delete titles of the selected music pieces in a list when the portable apparatus 10 is not playing a selected music piece. When the portable apparatus 10 is playing a selected music piece, the keyboard 30 can be used to transpose, change the tones or change the tempo.

Referring once more to FIG. 3, the first electrical signal from the microphone unit 13 is processed by the echo circuit 133 by adding an echo effect thereto. The strength of the echo effect can be adjusted by operating the keyboard 30. The output of the echo circuit 133 and a second electrical signal, which is the output of the MIDI sound source module 70, are received by the mixer 72. The mixer 72 is disposed in the casing 11 and mixes the inputs thereto to obtain a third electrical signal.

The transmitter 74 is disposed in the casing 11 and is connected electrically to the mixer 72. In this embodiment, the transmitter 74 comprises an FM modulator which modulates audio frequency signals, including the user voice input and the music information, into FM signals, and an RF source which transmits wirelessly the FM signals for reception and reproduction by an external speaker unit (not shown).

In order to synchronize the sound output with the lyrics, the CPU 20 sends synchronization clocks to the caption expansion slot 50. Thus, the caption display unit 60 is capable of showing the lyrics in a line-by-line manner and of indicating the word to be sung in accordance with the synchronization clocks when a music piece is being played.

Referring once more to FIGS. 1 and 2, an earphone jack 115 and a microphone jack 116 may be provided on the distal end of the second casing half 111. The earphone jack 115 permits connection of an earphone (not shown) to the portable apparatus 10 of this invention to enable the user to listen to the user voice input and the music information while the portable apparatus 10 is in use. The microphone jack 116 permits connection of another sound source (not shown) to the portable apparatus 10 to enable the latter to further transmit an audio frequency signal from the former.

Since the portable apparatus 10 of the present invention does not incorporate a speaker, the portable apparatus 10 can be made small and lightweight to facilitate carrying of the same during use. In addition, the audio output of the portable apparatus 10 can be transmitted at an adjustable frequency that can be received by conventional FM receivers, thereby permitting use of the portable apparatus 10 in an automobile.

Figure 10:
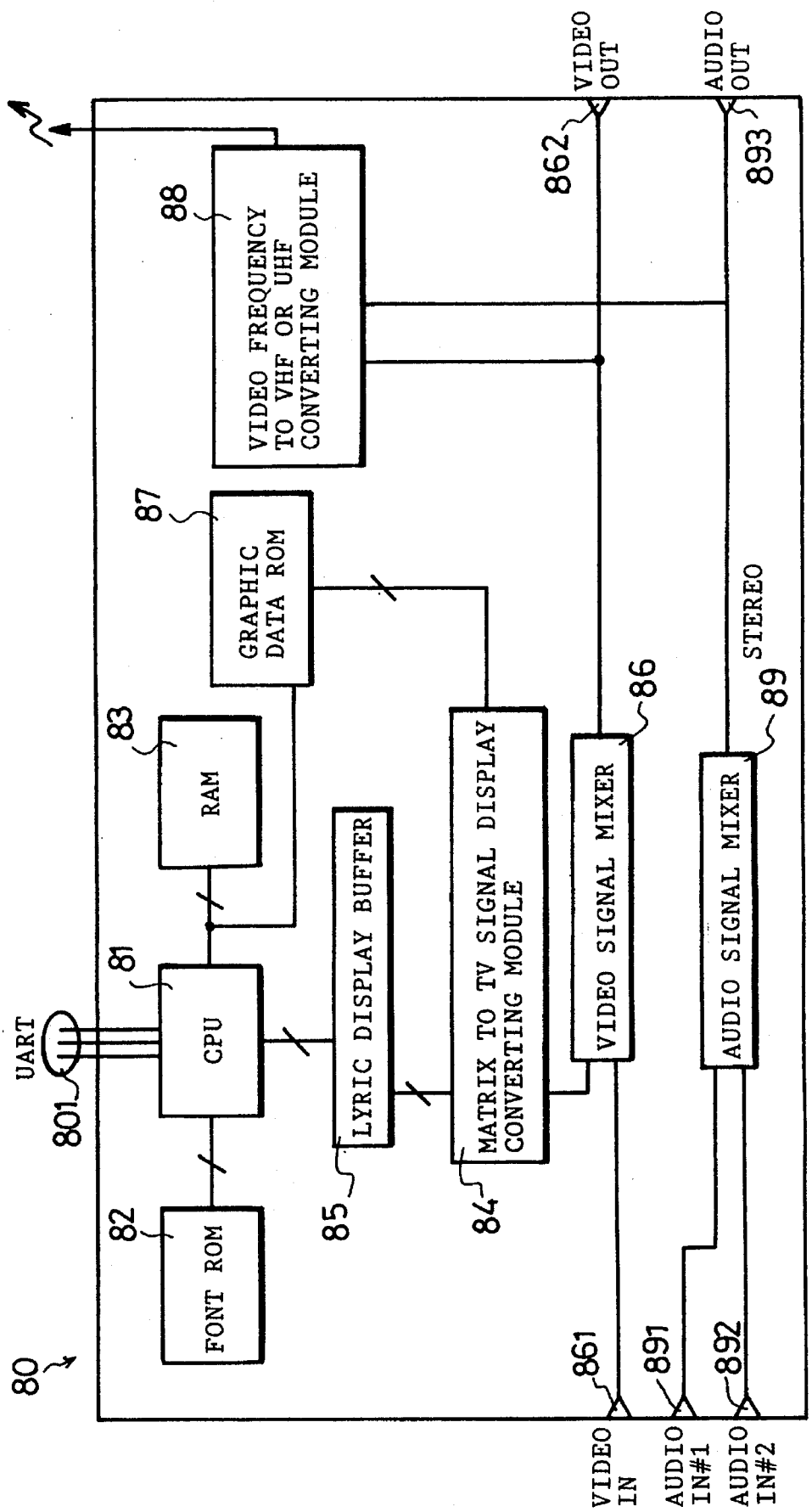
FIG. 10 is a schematic circuit block diagram of a television caption system of the portable apparatus of the present invention.

Referring to FIG. 10, instead of the caption display unit, a television caption system 80 may be connected to the caption expansion slot 50 for interfacing the CPU 20 and an external television set (not shown) to enable the latter to display the lyric data from the caption expansion slot 50 thereon. As shown, the television caption system 80 comprises a CPU 81 to be connected to the caption expansion slot 50 via a connector 801 for receiving the lyric data of the selected one of the music pieces therefrom, a font memory 82 connected to the CPU 81 for storing character fonts therein, a random access memory 83 connected to the CPU 81 for storing the lyric data from the caption expansion slot 50 therein, a matrix-to-television signal display converting module 84 connected to the CPU 81 for converting the lyric data received by the CPU 81 into a television signal, a lyric display buffer 85 which interconnects the CPU 81 and the converting module 84, a graphic data memory 87 connected to the CPU 81 for storing a stationary graphic image that is provided to the converting module 84 when the external video input signal is not available, a video signal mixer 86 connected to the converting module 84 for mixing output of the converting module 84 with an external video input signal from a video input port 861, a video frequency to VHF or UHF converting module 88 connected to the video signal mixer 86 for transmitting wirelessly output of the video signal mixer 86 for reception by the television set, and an audio signal mixer 89 which receives audio input signals from two audio input ports 891, 892 and which provides an audio output to the converting module 88 and to an audio output port 893. The video signal mixer 86 further provides the output thereof to a video output port 862, thereby permitting connection of the television caption system 80 to a television set via the video and audio output ports 862, 893.

Figure 11:
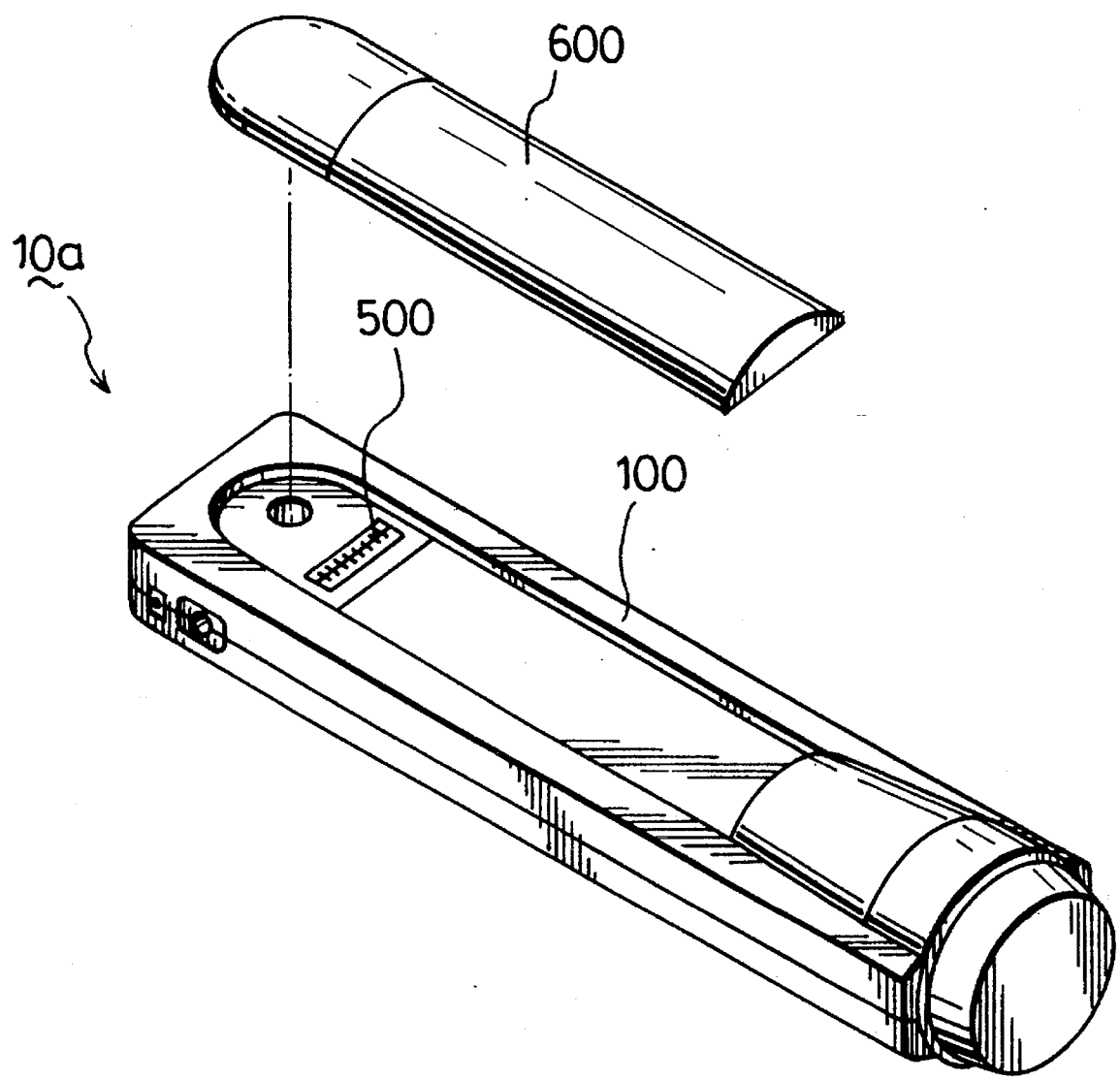
FIG. 11 is a perspective view of the second preferred embodiment of a portable apparatus according to the present invention.

Referring to FIGS. 11 and 12, the second preferred embodiment of a portable apparatus 10a according to the present invention is shown to similarly comprise a caption display unit 600. In this embodiment, however, the caption expansion slot 500 is mounted pivotally to the elongated casing 100 to permit turning up or turning down of the caption display unit 600 relative to the casing 100 when the portable apparatus 10a is in use.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A portable apparatus capable of transmitting wirelessly both musical accompaniment information stored in an integrated circuit card and a voice input from a user for reception and reproduction by an external speaker unit, the musical accompaniment information including music data of a plurality of music pieces, said portable apparatus comprising:

an elongated casing having a first end portion, a second end portion and an intermediate portion between said first and second end portions, said first and second end portions and said intermediate portion being substantially similar in cross section, said first end portion being adapted to be gripped by one hand of the user and confining a receiving space for receiving removably the integrated circuit card therein;

a microphone unit mounted on said second end portion of said casing for transforming the voice input from the user to a first electrical signal;

a processor unit disposed in said casing and connectable electrically to the integrated circuit card, said processor unit transforming the music data of a selected one of the music pieces into MIDI information;

a keyboard mounted on said intermediate portion of said casing and connected electrically to said processor unit, said keyboard being operable so as to control said processor unit to retrieve the music data of the selected one of the music pieces from the integrated circuit card;

a MIDI sound source module disposed in said casing and connected electrically to said processor unit, said MIDI sound source module receiving said MIDI information from said processor unit and transforming said MIDI information into a second electrical signal;

a mixer disposed in said casing and connected electrically to said microphone unit and said MIDI sound source module, said mixer mixing said first and second electrical signals and generating a third electrical signal; and a transmitter disposed in said casing and connected electrically to said mixer, said transmitter transmitting wirelessly said third electrical signal for reception and reproduction by the external speaker unit.

2. The portable apparatus as claimed in claim 1, wherein said first and second end portions and said intermediate portion of said casing are generally oval in cross section.

3. The portable apparatus as claimed in claim 1, wherein said first and second end portions and said intermediate portion of said casing are generally rectangular in cross section.

4. The portable apparatus as claimed in claim 1, wherein said second end portion of said casing has a distal open side, said microphone unit including a perforated cap mounted to said second end portion of said casing at said distal open side and an electroacoustic transducer disposed in said casing adjacent to said perforated cap, said transducer being connected electrically to said processor unit.

5. The portable apparatus as claimed in claim 1, wherein said first end portion of said casing is formed with an opening at one side thereof to permit entry of the integrated circuit card into said receiving space.

6. The portable apparatus as claimed in claim 5, wherein said receiving space of said casing has a connector provided therein for engaging removably the integrated circuit card and for connecting electrically the integrated circuit card to said processor unit.

7. The portable apparatus as claimed in claim 1, further comprising a function display unit disposed on said second end portion of said casing and connected electrically to said processor unit, said function display unit being activated by said processor unit so as to display identification data of the selected one of the music pieces thereon.

8. The portable apparatus as claimed in claim 1, wherein the music data of the music pieces stored in the integrated circuit card is pre-compressed, said portable apparatus further comprising a memory device disposed in said casing and connected electrically to said processor unit, said processor unit decompressing the music data of the selected one of the music pieces to produce said MIDI information, said processor unit storing said MIDI information in said memory device and providing said MIDI information in said memory device to said MIDI sound source module.

9. The portable apparatus as claimed in claim 8, wherein said memory device is a SRAM.

10. The portable apparatus as claimed in claim 1, wherein said transmitter comprises an FM modulator and an RF source for modulating and transmitting wirelessly said third electrical signal.

11. The portable apparatus as claimed in claim 1, wherein said MIDI information includes a plurality of note events of the selected one of the music pieces, each of said note events including time and speed information, pitch information and volume information, said processor unit being provided with a timer therein and being programmed to execute a play routine, said play routine being provided with a plurality of control parameters for controlling process of the selected one of the music pieces, said keyboard being operable so as to control said processor unit to modify said control parameters and information included in said note events to change accordingly tempo, key and other musical related controls of the selected one of the music pieces, said processor unit providing sequentially said note events to said MIDI sound source module in accordance with the time and speed information thereof counted by said timer.

12. The portable apparatus as claimed in claim 1, wherein the musical accompaniment information stored in the integrated circuit card further includes lyric data of the music pieces, said portable apparatus further comprising a caption expansion slot connected electrically to said processor unit and mounted to said casing, said processor unit retrieving the lyric data of the selected one of the music pieces from the integrated circuit card and providing the retrieved lyric data to said caption expansion slot.

13. The portable apparatus as claimed in claim 12, further comprising a caption display unit having a connector for engaging removably said caption expansion slot to connect electrically said caption display unit and said processor unit.

14. The portable apparatus as claimed in claim 13, wherein said caption display unit is a handheld display unit.

15. The portable computer as claimed in claim 14, wherein said caption display unit comprises:

a second processor unit connected electrically to said connector for receiving the lyric data from said caption expansion slot;

a first memory device, connected to said second processor unit, for storing character fonts therein;

a second memory device, connected to said second processor unit, for storing the lyric data received by said second processor unit therein;

a liquid crystal display; and a liquid crystal display controlling circuit which interconnects said second processor unit and said liquid crystal display to enable said liquid crystal display to show the lyric data from said caption expansion slot thereon.

16. The portable apparatus as claimed in claim 13, wherein said caption expansion slot is mounted pivotally to said casing to permit turning up or turning down of said caption display unit relative to said casing.

17. The portable apparatus as claimed in claim 12, further comprising a television caption system to be connected to said caption expansion slot for interfacing said processor unit and an external television set to enable the television set to display the lyric data from said caption expansion slot thereon.

18. The portable apparatus as claimed in claim 17, wherein said television caption system comprises:

a second processor unit to be connected to said caption expansion slot for receiving the lyric data of the selected one of the music pieces therefrom;

a first memory device, connected to said second processor unit, for storing character fonts therein;

a second memory device, connected to said second processor unit, for storing the lyric data from said caption expansion slot therein;

a matrix-to-television signal display converting module, connected to said second processor unit, for converting the lyric data received by said second processor unit into a television signal;

a video signal mixer, connected to said matrix-to-television signal display converting module, for mixing output of said matrix-to-television signal display converting module with an external video input signal; and a video frequency to VHF or UHF converting module, connected to said video signal mixer, for transmitting wirelessly output of said video signal mixer.

19. The portable apparatus as claimed in claim 18, wherein said television caption system further comprises a third memory device, connected to said second processor unit, for storing a stationary graphic image that is provided to said matrix-to-television signal display converting module when the external video input signal is not available.

20. The portable apparatus as claimed in claim 1, further comprising an echo circuit which interconnects said microphone unit and said mixer.

* * * * *